Jan. 19, 1954 T. E. GOODWIN 2,666,848
SELECTIVE AUDIO GATE CIRCUIT
Filed Dec. 2, 1948
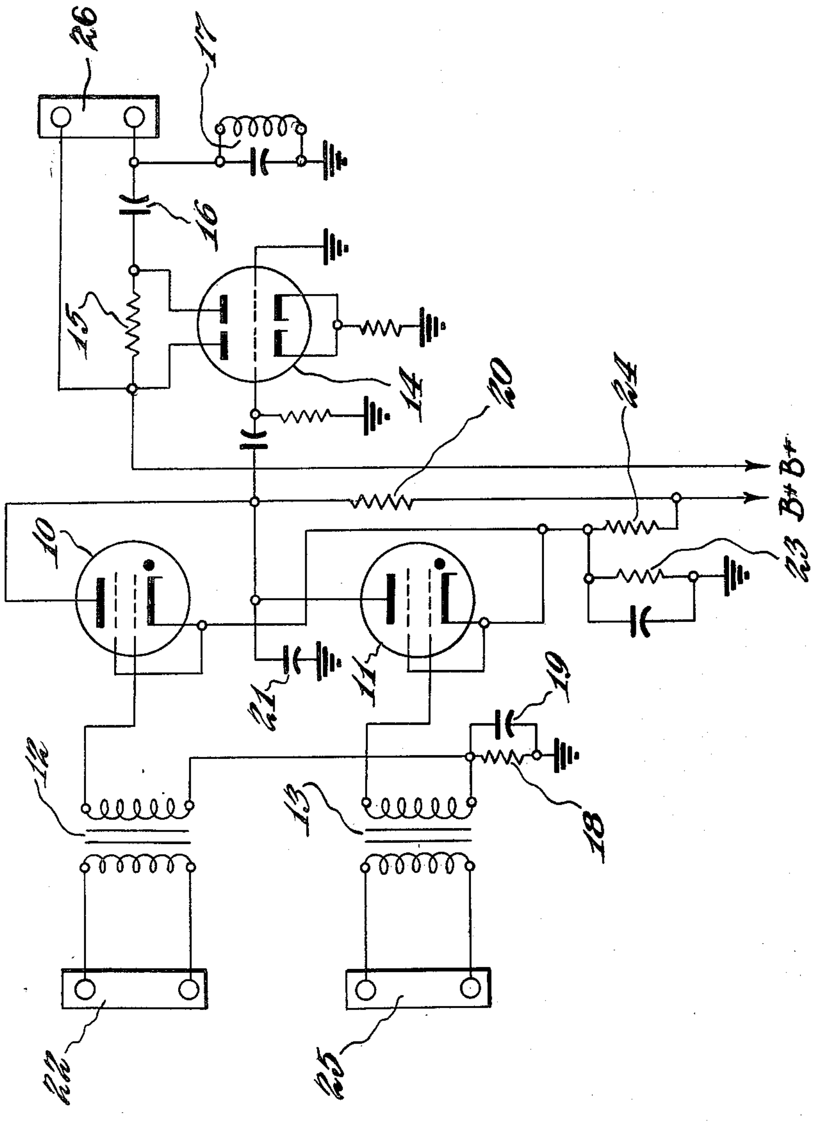
INVENTOR.
THOMAS E. GOODWIN
BY
E. M. Squire
ATTORNEY Patented Jan. 19, 1954 2,666,848

UNITED STATES PATENT OFFICE 2,666,848

SELECTIVE AUDIO GATE CIRCUIT

Thomas E. Goodwin, Hempstead, N. Y., assignor to Erco Radio Laboratories, Inc., Garden City, N. Y., a corporation of New York Application December 2, 1948, Serial No. 63,170

10 Claims. (Cl. 250—27)

This invention relates to electronic apparatus in general, more particularly this invention relates to a voltage selection circuit.

An object of this invention is to provide an electronic switching gate circuit which rapidly and automatically selects and passes the stronger of two audio frequency voltages and attenuates the weaker voltage by at least 75 decibels without any deleterious effects due to differences in phase relationship between the two input voltages.

A further object of the invention is the provision of a signal selecting or gating circuit of this character in which the selection takes place with a rapidity such that a separate selective action may occur for each successive cycle of the audio frequency input signals.

Another object of this invention is to provide an electronic switching device of sufficient sensitivity and selection sense to discriminate and switch between two audio frequency voltages and attenuate the weaker voltage, when their amplitude difference is 1 decibel or more.

Other and further objects of this invention will be apparent to those skilled in the art to which it relates from the following specification.

An illustrative but not exclusive application of this device is to combine the audio frequency outputs of two radio receivers when they are operating in dual diversity reception on either frequency shift or make and break carrier telegraph circuits, in such a manner that the stronger of the two signals is utilized and the weaker signal is attenuated. The device will also prevent cancellation of the two audio signal voltages, such as may be encountered due to multipath transmission, regardless of their phase relationship. It also improves the signal to noise ratio because it is less responsive to undesirable voltages having distorted wave form or to voltages whose frequencies are not conveying useful intelligence.

Further features of this invention will be set forth in detail in the specification when taken with the drawing in which the single figure is a schematic circuit diagram of an embodiment of the invention.

Referring to the drawing in detail reference numerals 10 and 11 designate two gas filled thyratrons that are employed as electronic switches. Input signals are supplied to the control grids of these thyratrons 10 and 11 through the untuned transformers 12 and 13 respectively. Dual triode 14 is a limiter and is so connected in the circuit as to remove the transient voltage peaks which occur in the common plate circuit of the thyratrons 10 and 11. A wave shape restoration circuit is provided at the output of the gate circuit for restoring the original substantially sinusoidal wave shape to the signal selected by the thyratrons 10 and 11 which appears, after limiting at the output terminals 26. This wave shape restoration circuit comprises the parallel resonant inductance-capacitance filter circuit 17 connected in the plate circuit of the limiter tube 14, for converting the flat-topped clipped wave form of the output signal back to its original shape. For purposes of illustration, a periodic transformer coupling 12 and 13 is indicated in the grid or input circuit of the thyratrons 10 and 11, respectively, but any other suitable means may be employed which provides a fairly low D. C. resistance in the grid to cathode return path.

One source of input signal voltage is applied to the grid of the tube 10 and the second source of input signal voltage is applied to the grid of the tube 11. The grid returns of both tubes 10 and 11 are connected to resistor 18 and shunt capacitor 19 which form a common grid return circuit and common source of grid bias for both gas filled tubes 10 and 11 which includes impedance means common to both tubes. Plate voltage for both of these tubes is furnished through common plate resistor 20. The capacitance value of charging capacitor 21 and the resistance value of the common plate resistor 20 are or chosen that their resulting time constant will correspond to the range of input audio frequencies being utilized. The operational characteristic of this R-C network is inherently broad causing it to be responsive throughout a band of audio frequencies.

An audio frequency input signal fed into input terminals 22 will cause the tube 10 to conduct at some time during the positive portion of the audio frequency cycle. Under this condition, capacitor 21 is quickly discharged and will not again reach a fully charged state for the duration of approximately one full cycle of the input signal. While the tube 10 is conducting, grid current will flow through common grid resistor 18 and increase the negative grid bias potential on the control grid of tube 11. Fixed grid bias for both tubes 10 and 11 is supplied by the potentiometer arrangement consisting of series connected resistors 23 and 24. This fixed grid biasing potential applied to their cathodes has the effect of preventing the gas filled tubes 10 and 11 from oscillating at a frequency determined by the R-C combination 20, 21 which might otherwise occur during the absence of an applied audio input voltage.

From the foregoing, it is apparent that it would be impossible for an applied audio voltage at the terminals 25 that is 180 degrees out of phase with the audio voltage at the terminals 22, to cause the tube 11 to conduct. The reason for its inability to do so is because the capacitor 21 cannot become fully charged within the time interval of a single ½ cycle and additonal grid bias is present because the tube 10 is still in a conducting state. Because of this lock out feature, there can be no random sequence of audio input voltage applied to both terminals 22 and 25 that makes it possible for both the tubes 10 and 11 to conduct simultaneously. At the end of the above mentioned cycle however, the tube 11 can be made to conduct if the applied audio input voltage at the terminals 25 is greater in amplitude than the voltage at the terminals 22. When the tube 10 is conducting, it will permit passage of the audio voltage appearing at the input terminals 22 and will cause it to appear at the output terminals 26 and, by reason of this lock out feature, it will not permit the passage of any audio voltage appearing at the terminals 25 to appear at the output terminals 26. When the tube 11 is conducting, this lock out switching sequence will be reversed.

The difference in input voltage amplitude, which is required to cause selective operation of one of the tubes 10 or 11 accompanied by locking out of the other tube, is 1 decibel or more.

The rapid discharge of capacitor 21 causes resulting wave form appearing in the common plate circuit of the tubes 10 and 11 to be saw tooth in shape. This saw tooth voltage is converted into square waves by the limiting action of the dual triode 14 and again reconverted to sine waves by the filtering action of the inductance and capacitance circuit 17. Thyratrons 10 and 11 are not amplifiers and should be considered as selective repeaters or converters which are very sensitive to the difference in amplitude of their respective input voltage. Because of the time constant of the resistive and capacitative elements in their circuit, they tend to respond only to a predetermined continuity of repetitious wave forms and therefore reject spurious noise pulses unless these noise pulses are of a frequency and amplitude similar to that of the operating input signals.

While there has been disclosed in this specification an embodiment of this invention in detail, it is of course understood that this invention is not to be so limited except in so far as the details are set forth in the following claims.

I claim:

1. A rapid switching and mixing circuit adapted for use in a diversity radio telegraph receiver so that in the common output, any phase difference between any two audio frequency input voltages having substantially sine wave shapes and tending to produce cancellation effects such cancellation effects are prevented comprising: a plurality of audio input circuits, a plurality of gas-filled electron discharge devices having each of their respective control grids separately connected to one of said input circuits, said input circuits having a common return through common impedance means, the anodes of said discharge devices being connected to a common output circuit having a time-constant within the range of periodicity of the frequencies at which said audio circuits are adapted to operate, whereby the outputs of said discharge devices are a series of saw-tooth pulses, means for clipping said saw tooth outputs to produce square waves therefrom, and filtering means connected to said clipping means to produce the counterpart of the original sine wave inputs.

2. A signal selector circuit for use in a diversity radio telegraph receiver system comprising in combination a plurality of sine wave input circuits, a plurality of gas-filled electron discharge devices having their respective control grids individually connected to said input circuits and having a common grid biasing means, the anodes of said discharge devices being connected to a common output circuit having a time-constant substantially corresponding to the period of the input frequencies, a clipping circuit connected to said output circuit, and means connected to said clipping circuit to synthesize the sine wave inputs, whereby effective discrimination is obtained between said input circuits as to magnitude of input signal and undesirable noise and signal components.

3. An electronic switch signal selector circuit comprising a pair of audio input circuits, a pair of thyratron tubes, having their respective control grids individually connected to said input circuits, said input circuits having a common return circuit including common grid biasing means, the cathodes of said tubes having a common cathode resistor for supplying a normal fixed bias potential between said control grids and said anodes, the anodes of said tubes being connected to a common output circuit having a time-constant substantially corresponding to the period of the input frequencies, said fixed biasing means serving to prevent oscillation of said thyratron tubes at a frequency determined by the constants of said common output circuit, a clipping circuit connected to said output circuit, and means connected to said output circuit to reproduce the counterpart of the input signals.

4. In an electronic gate circuit, the combination of a pair of audio frequency input circuits, a pair of thyratron tubes having their respective control grids individually connected to said input circuits, a common grid return circuit including common grid biasing means, the anodes of said thyratrons being connected to a common first output circuit having a time-constant substantially corresponding to the period of the input frequencies, the common biasing means preventing said tubes from oscillating at a frequency determined by the constants of said common output circuit and insuring that only one of said tubes is in a conducting state at one time, a dual triode signal limiter having one grid connected to said common output circuit and having a second grid connected to ground, a resistor connected between the anodes of said dual triode, and a second output circuit connected to said anodes of said triode including a filter for modifying the output wave shape to simulate the wave shape of the input signals.

5. An electronic selector circuit of the class described, comprising: a plurality of aperiodic input circuits operating in a common range of frequencies; a gas filled electron discharge device connected to each of said input circuits, each discharge device having a cathode, an anode and a control grid, each of said control grids being individually connected to each of said input circuits; a common return circuit including common impedance means for said control grids; and a common output circuit connected to said anodes, said output circuit comprising at least one reactive circuit element connected to provide a time constant for said output circuit corresponding to the period of a cycle of a frequency within said range, said common grid return circuit being cooperatively connected with respect to said common output circuit, said cooperative connection, upon the occurrence of conduction through one of said discharge devices, operating to prevent subsequent conduction through any other of said discharge devices for a time interval whose duration approximates one half cycle of said frequency within said range, the duration of said operation prevention interval being determined at least in part by said time constant of said output circuit.

6. A selector circuit according to claim 5, and further comprising filter means connected to said output circuit, said filter having characteristics adapted to modify the output wave shape to stimulate the wave shape of the input signals.

7. A selector circuit according to claim 5, in which said common output circuit comprises a capacitor and a resistor connected in series, said capacitor being connected to all of the anodes of the discharge devices to be rapidly discharged by the first of said discharge devices to become conductive, to a potential tending to prevent subsequent conduction by any other of the discharge devices, and said resistor being connected to permit recharging of said capacitor to a potential where it may again be discharged by any one of the discharge devices, only after the elapse of a time interval whose duration approximates one-half cycle of said frequency within said range of frequencies of the input frequency band.

8. A selector according to claim 5, in which said common impedance means comprises a resistor.

9. A selector according to claim 5, in which said common impedance means comprises the parallel connected combination of a resistor and a capacitor.

10. A selector according to claim 5 further comprising a source of fixed biasing potential connected to maintain said control grids at a relatively negative potential with respect to their cathodes for preventing oscillatory discharge of said discharge devices in the absence of an input signal.

THOMAS E. GOODWIN.

References Cited in the file of this patent

UNITED STATES PATENTS

| Number | Name | Date |
|---|---|---|
| 2,173,154 | Bernard | Sept. 19, 1939 |
| 2,253,832 | Whitaker | Aug. 26, 1941 |
| 2,350,888 | Hall | June 6, 1944 |
| 2,448,866 | Crosby | Sept. 7, 1948 |
| 2,473,432 | Johnston | June 14, 1949 |
| 2,499,613 | Thompson | Mar. 7, 1950 |
| 2,503,957 | Lyons | Apr. 11, 1950 |
| 2,553,271 | Peterson | May 15, 1951 |